(12) United States Patent
Aoki et al.

(10) Patent No.: US 6,714,365 B2
(45) Date of Patent: Mar. 30, 2004

(54) OPTICAL MODULE

(75) Inventors: Takuma Aoki, Tokyo (JP); Hiroshi Matsuura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/970,760

(22) Filed: Oct. 3, 2001

(65) Prior Publication Data
US 2002/0071188 A1 Jun. 13, 2002

(30) Foreign Application Priority Data
Nov. 10, 2000 (JP) ........................................ 2000-343584

(51) Int. Cl.$^7$ .............................. G02B 7/02; G02B 6/36
(52) U.S. Cl. .......................................... 359/819; 385/92

(58) Field of Search ................................ 359/811, 819, 359/808; 385/33–36, 88, 92; 372/34, 36

(56) References Cited

U.S. PATENT DOCUMENTS

| 5,016,965 A | * | 5/1991 | Marshall et al. ............... 385/35 |
| 2003/0081914 A1 | * | 5/2003 | Steinberg et al. ............. 385/94 |

* cited by examiner

Primary Examiner—Georgia Epps
Assistant Examiner—William Choi
(74) Attorney, Agent, or Firm—Knobbe, Martens, Olson & Bear, LLP (57) ABSTRACT

An optical module according to the present invention has a package, an optical element, and a mounting stage interposed between the optical element and the package. The surface of the mounting stage to which the optical element is bonded is smoother than the bottom surface of the package to which the mounting stage is fixed.

8 Claims, 6 Drawing Sheets

FIG. 10

OPTICAL MODULE

BACKGROUND OF THE INVENTION

1. Field of the Invention

The present invention relates to an optical module into which an optical element is incorporated.

2. Description of the Related Art

Currently, practical use has been made of optical modules which have a variety of functions and comprise various optical elements such as an optical filter or optical crystal.

The optical module includes a package in which various optical elements are housed. More particularly, the optical element is directly fixed to the bottom surface of the package by means of adhesive such as an epoxy-based adhesive. In general, the package is formed of a metal material and the bottom surface of the package is formed flat by cutting using end mills or the like. The flatness of the bottom surface is critical in establishing an accurate mutual alignment between optical elements.

However, the bottom surface has a number of scratches caused by cutting and the depth of the scratches is not uniform. Therefore, the bottom surface of the package has a rough surface in comparison with the surface of optical elements such as an optical filter or optical crystal. Thus, when an optical element is fixed to the bottom surface of the package by means of adhesive, the thickness of an adhesive layer between the bottom surface and the optical element varies greatly because of the roughness of the bottom surface.

On the other hand, the adhesive expands or contracts as the ambient temperature varies. Such expansion or contraction of the adhesive tends to increase the variation in thickness of the adhesive layer in accordance with the difference in the thickness. Accordingly, a variation in ambient temperature would cause the adhesive layer to impose an uneven stress to the optical element, producing strain in the optical element. Consequently, the optical elements become misaligned with each other, causing the optical property of the optical module to greatly depend on variations in ambient temperature.

To solve the aforementioned problems, it can be contemplated to polish the bottom surface of the package to reduce the roughness of the bottom surface. However, additional polishing of the bottom surface would increase the overall time and cost required for fabrication of the package, thereby making the resulting optical module expensive.

An object of the present invention is to provide an inexpensive optical module whose optical property depends less on the ambient temperature and can maintain the stability.

SUMMARY OF THE INVENTION

An optical module according to the present invention comprises a package, an optical element, and a member interposed between the optical element and the package. The surface of the member to which the optical element is bonded is smoother than the surface of the package to which the member is fixed.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Optical elements defined according to the present invention include optical filters, birefringence crystals, prisms, mirrors, and the like which can change the optical and/or geometrical nature of light delivered thereto by itself.

Figure 1:
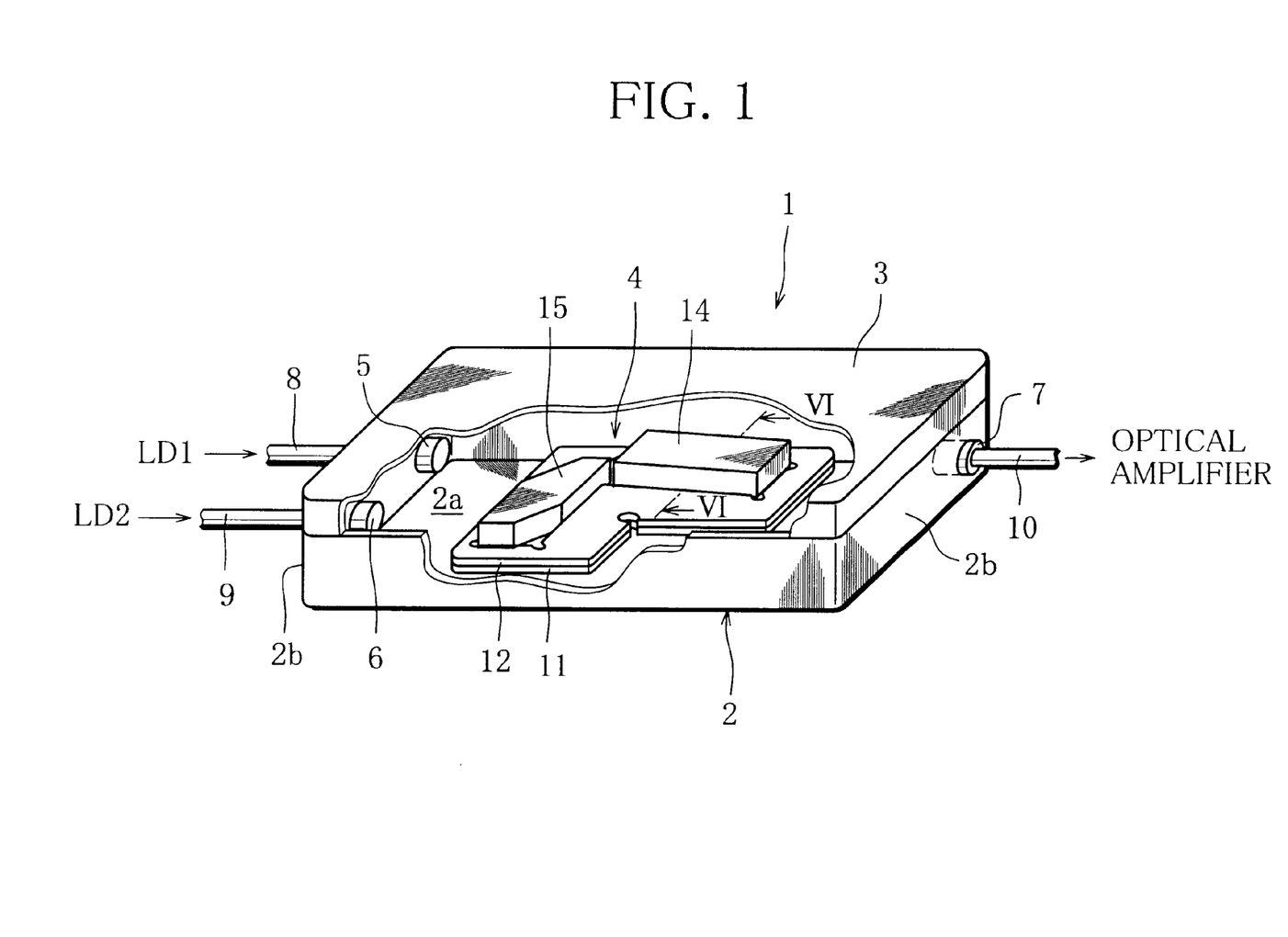
FIG. 1 is a partially cut-away perspective view illustrating an optical module according to an embodiment of the present invention.

For example, an optical module 1 of FIG. 1 is a polarization beam combiner, interposed between two optical fibers 8 and 9 extending from laser diodes LD1 and LD2 and an optical fiber 10 coupled to a light amplifier. The optical module 1 combines and delivers polarization beams emitted from the laser diodes LD1 and LD2.

The optical module 1 comprises a package 2 formed of metal. The package 2 is formed in the shape of a rectangle parallelepiped having an upper opening and the upper opening of the package 2 is covered with a lid 3.

The package 2 has a bottom surface 2a and end walls 2b that are opposite to each other. On one end wall 2b, there is formed a pair of inlet collimators 5 and 6, while there is formed one outlet collimator 7 on the other end wall 2b. End portions of the optical fibers 8 and 9 are connected to the collimators 5 and 6 respectively, and collimators 5 and 6 are protruded into the package 2. On the other hand, the proximal portion of the optical fiber 10 is connected to the collimator 7, and the collimator 7 is protruded into the package 2 as well.

Here, the collimators 5, 6, and 7 are positioned in a same plane parallel to the bottom surface 2a of the package 2, while the collimators 5 and 7 are coaxial with each other.

There is provided a mount stage 4 at the center of the bottom surface 2a of the package 2. On the mount stage 4, there are provided optical elements such as a birefringence crystal 14 and a prism 15. The crystal 14 and the prism 15 are each 2 mm high, for example.

Figure 2:
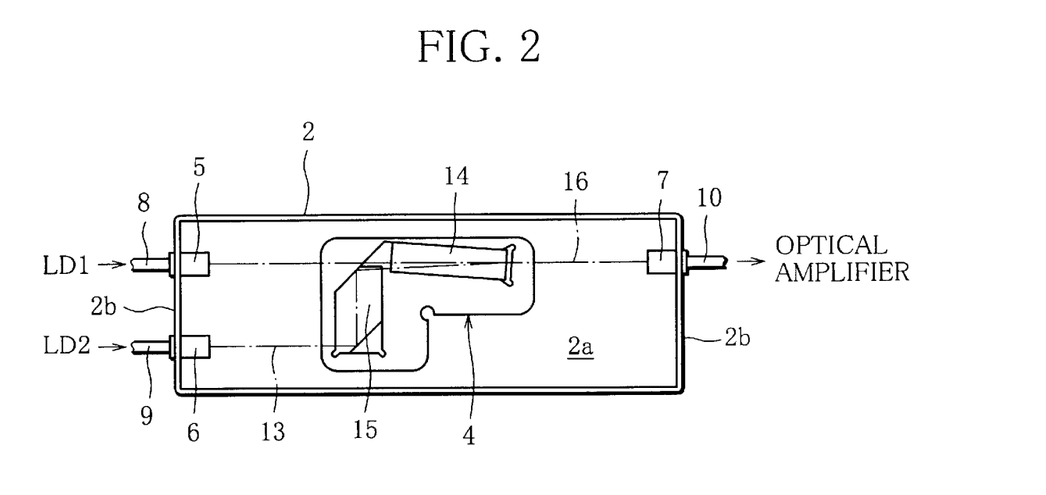
FIG. 2 is a plan view illustrating the optical module of FIG. 1 with the lid thereof being removed.
Figure 3:
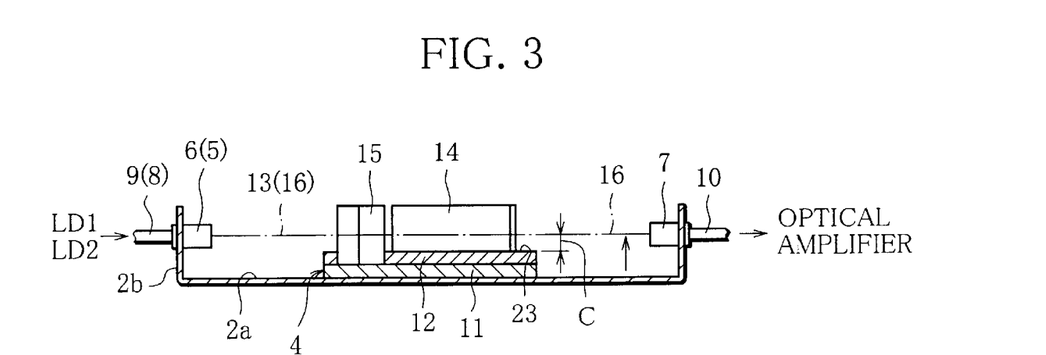
FIG. 3 is a longitudinal sectional view illustrating the optical module of FIG. 2.

As can be seen clearly from FIGS. 2 and 3, the crystal 14 is interposed in an optical axis 16, indicated by an alternate long and short dashed line, extending between the collimator 5 and the collimator 7. On the other hand, the prism 15 is interposed in an optical axis 13, indicated by an alternate long and short dashed line, extending from the collimator 6. The optical axis 13 is bent twice in the prism 15 and leads to the optical axis 16 in the birefringence crystal 14.

The optical axes 13 and 16 pass through the center of the height of the crystal 14 and the prism 15.

Figure 4:
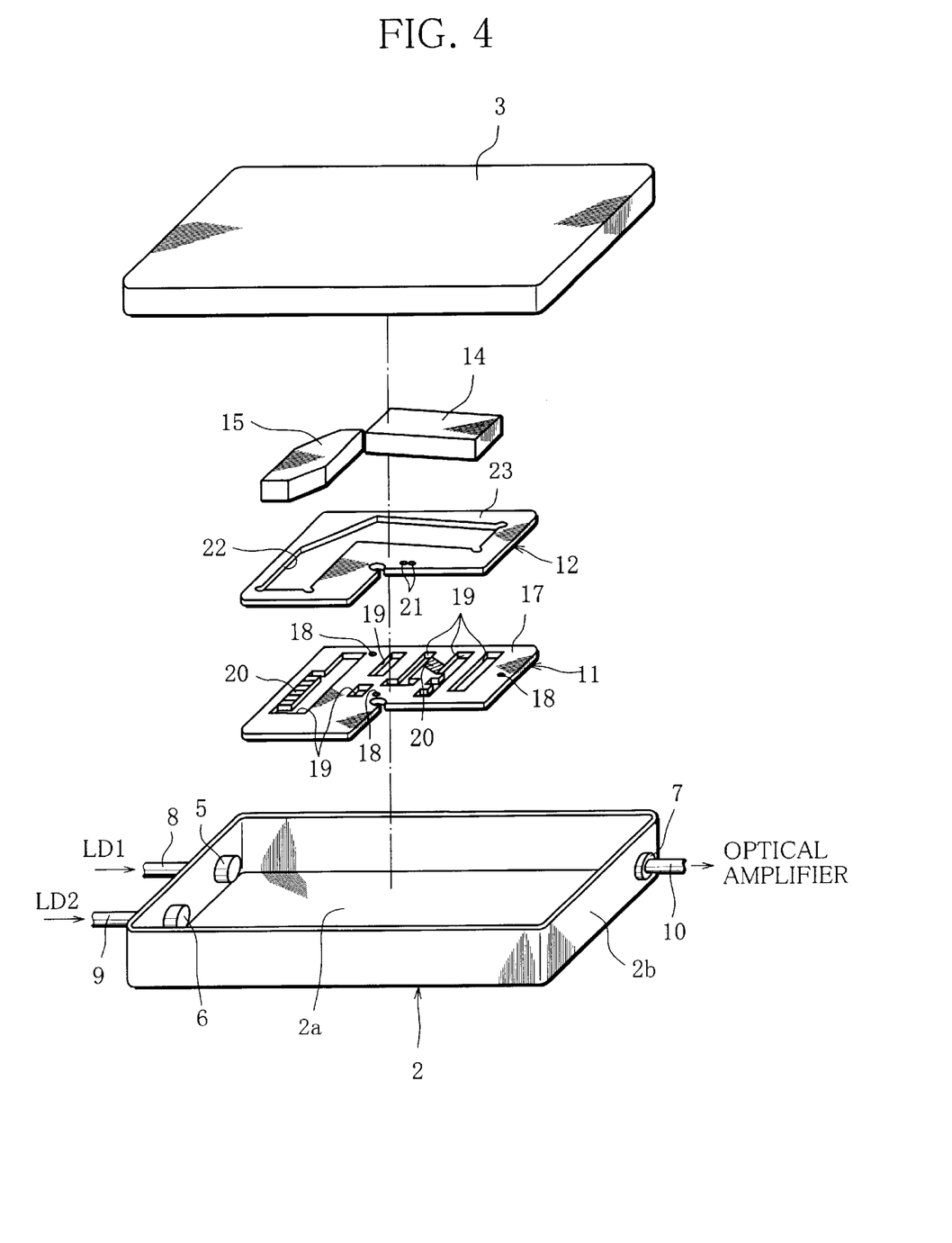
FIG. 4 is an exploded perspective view illustrating the optical module of FIG. 1.

The mount stage 4 includes a lower plate 11 fixed to the bottom surface 2a of the package 2 and an upper plate 12 superimposed on the lower plate 11. The lower plate 11 and the upper plate 12 have the same contour. As will be described later, the lower plate 11 is used to fix the crystal 14 and the prism 15, while the upper plate 12 is used for positioning of the crystal 14 and the prism 15 on the lower plate 11.

Figure 7:
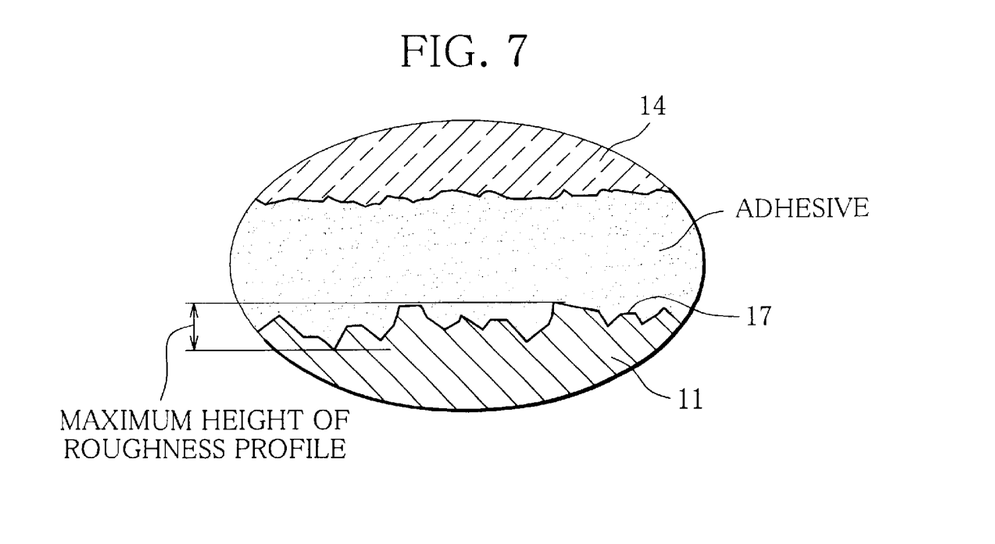
FIG. 7 is an enlarged view showing region VII of FIG. 6.

For example, the lower plate 11 is obtained by cutting out a rolled steel sheet of SUS304 specified in JIS (Japanese Industrial Standard). The rolled steel sheet has a thickness less than 600 μm, preferably from 200 μm to 300 μm, and both surfaces thereof are about 1 μm in maximum height of roughness profile. Incidentally, the maximum height of roughness profile is specified in ISO 4287: 1997 and JIS B 0601: 2001. As schematically illustrated in FIG. 7, the maximum height of roughness profile is defined as the distance in the direction of height between the highest and lowest points in the roughness curve. The lower plate 11 that is cut out of the aforementioned rolled steel sheet has an upper surface 17 of a maximum height of roughness profile of 1 μm. Incidentally, for example, the maximum height of roughness profile of the rolled steel sheet and the lower plate 11 can be measured using "surfcom 575A" made by TOKYO SEIMITSU Co., LTD.

As is obvious from FIG. 4, there are provided a plurality of through-holes 19 on the lower plate 11. These through-holes 19 have various sizes and shapes, which are distributed in accordance with a predetermined arrangement pattern. In addition, on the upper surface of the lower plate 11, regions 20-to-be applied with adhesive are defined for bonding the crystal 14 and the prism 15 thereto, respectively, and are shaded in FIG. 4. Here, a part of the contour of each of the regions 20 is bounded by one or a plurality of adjacent through-holes 19.

Chemical etching is employed to cut the lower plate 11 out of a rolled steel sheet. More particularly, the chemical etching comprises the step of masking one side of the rolled steel sheet with a photoresist so that boundary portions for producing the contours of the lower plate 11 and each through-hole 19 are exposed, and the step of etching the boundary portions of the rolled steel sheet with an acid to remove the boundary portions. As a result, the lower plate 11 is cut out of a rolled steel sheet.

The lower plate 11 obtained from the aforementioned chemical etching is placed on the bottom surface of the package 2 and then spot welded to the bottom surface of the package 2 at three points 18 that define the tops of a triangle as shown in FIG. 4. For example, as the aforementioned spot welding, it is possible to use the laser welding employing the Nd-YAG laser.

Like the lower plate 11, the aforementioned upper plate 12 is obtained by cutting out a rolled steel sheet of SUS304 through chemical etching and has a thickness of 200 μm. An adjustment hole 22 is formed in the upper plate 12. The adjustment hole 22 is provided with a shape and size large enough to accommodate the crystal 14 and the prism 15.

The upper plate 12 is superimposed on the lower plate 11 and then fixed to the lower plate 11 by spot welding employing, for example, the Nd-YAG laser at two adjacent points 21 near the outer periphery of the lower plate 11 as shown in FIG. 4.

Figure 5:
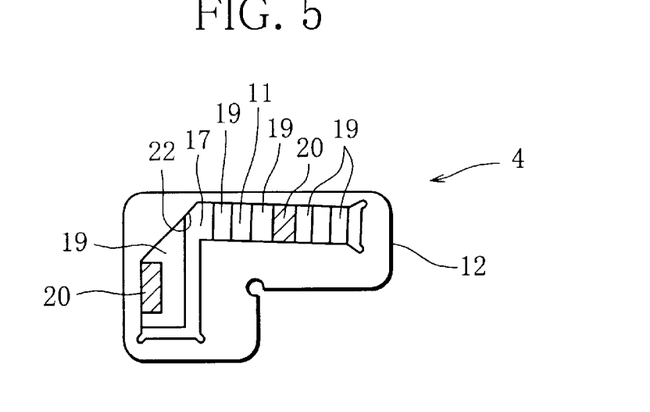
FIG. 5 is a plan view illustrating a mount stage of the optical module of FIG. 1.

With the upper plate 12 being fixed to the lower plate 11 so as to match the peripheries of the plate 11 and 12 to each other, the regions 20 of the lower plate 11 are exposed through the adjustment hole 22 of the upper plate 12 as shown in FIG. 5. That is, the inner periphery of the adjustment hole 22 defines the contour of the regions 20 in cooperation with the aforementioned through-holes 19.

Subsequently, a certain amount of adhesive is dripped from a dispenser to each of the regions 20. Then, the crystal 14 and the prism 15 are accommodated into the adjustment hole 22 of the upper plate 12, and then fixed to predetermined positions on the lower plate 11 via the applied adhesive. At this time, the applied adhesive spreads over each of the regions 20, thereby forming adhesive layers between the crystal 14 and prism 15 and the regions 20 of the lower plate 11, respectively.

Upon bonding the crystal 14 and the prism 15, the adjustment hole 22 of the upper plate 12 prevents the crystal 14 and the prism 15 from being displaced on the lower plate 11. This allows the crystal 14 and the prism 15 to be accurately positioned and fixed onto the upper surface 17 of the lower plate 11 via the adhesive layers. Consequently, the alignment of the crystal 14 and the prism 15 with the optical axes 13 and 16, that is, optical coupling between the optical fibers 8 and 9 and the optical fiber 10 is established with high accuracy.

As described above, the contour of each of the regions 20 is bounded by the inner periphery of one or a plurality of through-holes 19 and the inner periphery of the adjustment hole 22. Too much adhesive will squeeze out of the inner periphery of the through-holes 19 and then remains in the inner periphery by surface tension or escapes into the through-holes 19. This therefore allows the aforementioned adhesive layer to be positively formed all over the regions 20, whereby the regions 20 provide a consistent effective bonding area for the crystal 14 and the prism 15. Accordingly, the crystal 14 and the prism 15 can be bonded with stability.

Incidentally, the type of the adhesive is determined as appropriate, and this embodiment employs an epoxy-based two-part thermosetting adhesive. Upon dripping of an adhesive, it is possible to control the amount of the adhesive dripping from the dispenser with a far better accuracy by maintaining the adhesive at a constant viscosity all the time.

In addition, the adjustment hole 22 allows the crystal 14 and prism 15 to accommodate together; however, adjustment holes 22 may be formed on the upper plate 12 for the crystal 14 and the prism 15, respectively.

Figure 6:
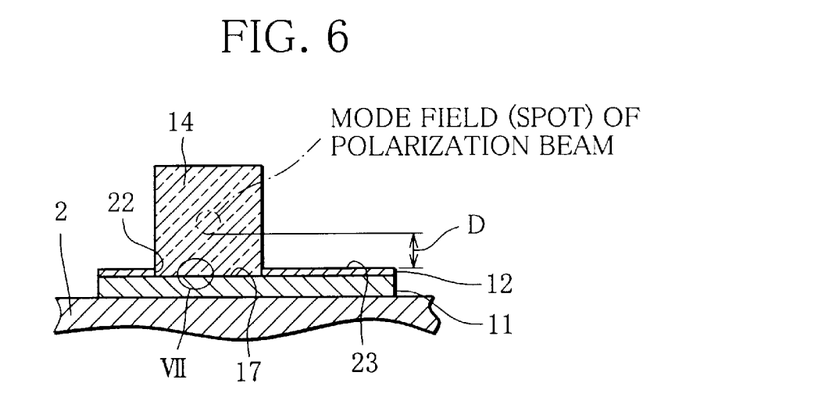
FIG. 6 is a sectional view taken along line VI—VI of FIG. 1.

As shown in FIG. 3, the crystal 14 and the prism 15 are mounted to the mount stage 4. In this case, it is preferable that an upper surface 23 of the upper plate 12 is spaced apart by a predetermined distance C from the aforementioned optical axes 13 and 16 in the height direction of the crystal 14 or the prism 15. More preferably, the distance C is 1.5 times larger than the diameter of the mode field of a polarization beam that propagates through the birefringence crystal 14 or the prism 15. In other words, as shown in FIG. 6, it is preferable that the upper surface 23 is spaced apart by a predetermined distance D from the lower end of the mode field (spot) of the polarization beam in the height direction of the crystal 14 or the prism 15. And more preferably, the distance D is larger than the diameter of the mode field.

More specifically, as described above, since the crystal 14 and the prism 15 are 2 mm in height and the optical axes 13 and 16 pass through the center of height of the crystal 14 and the prism 15, the distance between the upper surface 17 of the lower plate 11 and the optical axes 13 and 16 is 1000 µm in the height direction of the crystal 14 or the prism 15. Furthermore, this embodiment allows the aforementioned optical system to set the diameter of the mode field of the polarization beam to about 400 µm, and the upper plate 12 has a thickness of 200 µm. This provides a distance of 800 µm between the upper surface 23 of the upper plate 12 and the optical axes 13 and 16. Therefore, the distance D of about 600 µm is provided, thereby making the distance D 1.5 times of the diameter of the mode field. Incidentally, with the diameter of the mode field being increased to 500 µm, the distance D is about 550 µm or more than the diameter of the mode field.

As described above, the upper plate 12 is spaced sufficiently apart from the polarization beam that propagates through the crystal 14 and the prism 15. This prevents the upper plate 12 from exerting an adverse effect on the diffraction or deflection of the polarization beam, thereby preventing a substantial deterioration in optical property of the optical module 1.

As can be seen clearly from FIG. 2, the aforementioned optical module 1 allows a polarization beam emitted from the laser diode LD1 to pass through the end of the optical fiber 8. Then, the polarization beam is introduced into the package 2, passes through the birefringence crystal 14, and is thereafter delivered from the optical fiber 10.

On the other hand, the laser diode LD2 emits a polarization beam having a polarization plane orthogonal to that of the polarization beam emitted from the laser diode LD1. The polarization beam from the laser diode LD2 is introduced into the package 2 from the end of the optical fiber 9 and incident first on the prism 15. The polarization beam is refracted repeatedly in the prism 15, then transmitted from the prism 15 to the birefringence crystal 14, and thereafter delivered from the optical fiber 10 via the birefringence crystal 14. Accordingly, the two polarization beams emitted from the laser diodes LD1 and LD2 are combined in the crystal 14 and then propagate to the optical amplifier.

The upper surface 17 of the lower plate 11 of the mount stage 4 has the maximum height of roughness profile lying within the aforementioned range. As shown in FIG. 7, this allows a variation in thickness of each of the adhesive layers to be considerably reduced, thereby making the thickness of the adhesive layers uniform all over the regions 20.

This prevents the crystal 14 and the prism 15 from suffering an uneven stress due to expansion or contraction of the adhesive caused by a variation in ambient temperature, thereby making it possible to reduce the strain occurred on the crystal 14 and the prism 15. Accordingly, the optical property of the optical module 1 according to this embodiment is not subjected to variations in ambient temperature, thereby making it possible to provide the optical module 1 with a good optical property that is independent of the ambient temperature.

In addition, the lower plate 11 and the upper plate 12 of the optical module 1 are obtained by cutting out of the rolled steel sheet by chemical etching as described above. This prevents burrs from being produced on the contour of the lower plate 11, the inner periphery of the through-holes 19, and the inner periphery of the adjustment hole 22 of the upper plate 12.

This allows the upper and lower surfaces of the lower plate 11 and the upper plate 12 to be maintained flat. It is therefore made possible not only to fix the lower plate 11 to the bottom surface 2a of the package 2 but also to fit the crystal 14 and the prism 15 to the upper surface of the lower plate 11 with high accuracy. Furthermore, the crystal 14 and the prism 15 are not subjected to damage caused by the burrs.

Suppose that the lower plate 11 and the upper plate 12 are obtained from the rolled steel sheet by machining such as cutting or punching, burrs or deflections are caused on the outer peripheries of the lower and upper plates 11 and 12 or the inner peripheries of the through-holes 19 and the adjustment hole 22. These burrs or warpage make it difficult to accurately fix the lower plate 11, the crystal 14, and the prism 15, or cause the crystal 14 or the prism 15 to be damaged.

The aforementioned chemical etching provides the lower plate 11 and the upper plate 12, having the desired maximum height of roughness profile, easily in a shorter time than the mechanical polishing of the bottom surface 2a of the package 2. This makes it possible to fabricate the optical module 1 at low costs.

Furthermore, the lower plate 11 of the mount stage 4 is fixedly spot welded to the bottom surface 2a of the package 2 only at the three points 18, while the upper plate 12 is also fixedly spot welded to the upper surface 17 of the lower plate 11 only at the two points 21. This prevents the crystal 14 and the prism 15 from suffering considerable stress resulting from expansion or contraction of the lower plate 11 and the upper plate 12, which are caused by variations in ambient temperature. Consequently, the optical property of the optical module 1 depends less on the ambient temperature.

Figure 8:
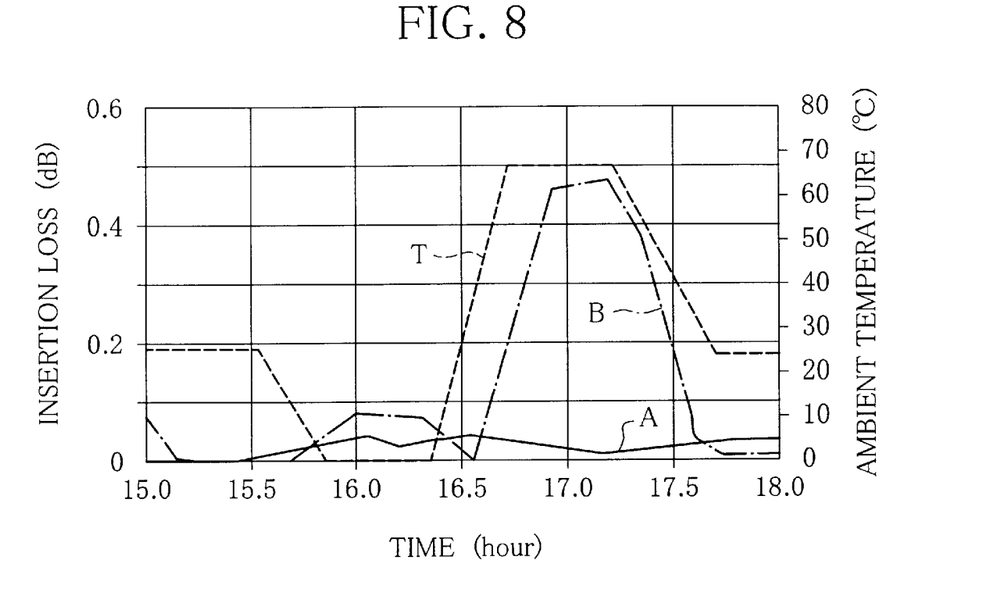
FIG. 8 is a graph showing the insertion loss property of the optical module of FIG. 1 against the ambient temperature.

FIG. 8 shows the insertion losses of the optical module 1 shown in FIG. 1 and the aforementioned prior-art optical module against the variation in ambient temperature, indicated by solid line A and an alternate long and short dashed line B, respectively. Incidentally, the dashed line T of FIG. 8 shows the variation in ambient temperature with time.

Incidentally, the prior-art optical module has a package with a bottom surface having a maximum height of roughness profile of 5 µm. This maximum height of roughness profile was measured using the "surfcom 575A" made by TOKYO SEIMITSU Co., LTD.

As can be seen from FIG. 8, within the range of ambient temperatures from 0° C. to 67° C. with respect to a room temperature of 25° C. as a reference, the insertion loss of the prior-art optical module varies greater than 0.4 dB. In contrast, the insertion loss of the optical module 1 according to this embodiment varies less than 0.05 dB. Thus, the optical module 1 of this embodiment has less dependency on the variation in ambient temperature in comparison with the prior-art optical module.

Incidentally, the present invention can be modified in a variety of ways without being limited to the aforementioned embodiment.

For example, in an embodiment, recessed portions may be formed instead of a plurality of through-holes 19 formed on the lower plate 11. The shape, size, and arrangement of the recessed portions or the through-holes 19 are set as appropriate without any restriction.

Furthermore, the position and the number of points of spot welding for the lower plate 11 and the upper plate 12 are set as appropriate without any restriction. In addition to the spot welding, the lower plate 11 and the upper plate 12 can be fixed using solder or the like in a spot-wise manner, and the fixing method can be selected as appropriate.

Figure 9:
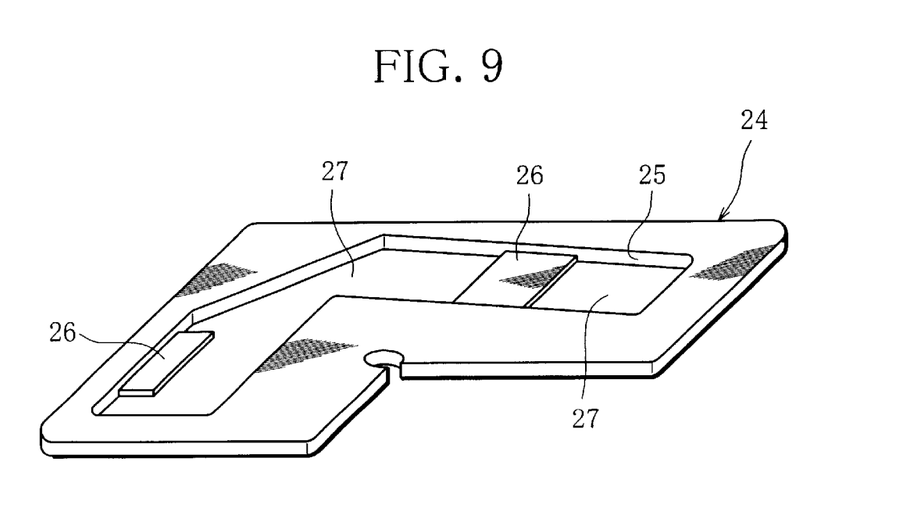
FIG. 9 is a perspective view illustrating a mount stage of an optical element according to a modified embodiment of the present invention.

Furthermore, in an embodiment, the mount stage 4 has the lower plate 11 and the upper plate 12; however, the mount stage may be formed of a piece of metal plate as shown in FIG. 9.

More specifically, a mount stage 24 of FIG. 9 is cut out from a rolled steel sheet by chemical etching along a predetermined contour thereof, the mount stage 24 includes a recessed portion 25 serving as an adjustment hole 22. The recessed portion 25 has two stage surfaces 26, on which the crystal 14 and the prism 15 are mounted through adhesive layers respectively. The bottom surface 27 is lower than the stage surfaces 26 so that the bottom surface 27 serves as the through-hole 19. The stage surface 26 is formed upon pressing the recessed portion 25. The bottom surface 27 is formed by chemical etching with the stage surfaces 26 being protected by a mask so that too much adhesive applied to the each of the stage surfaces 26 escapes therefrom. Like the aforementioned embodiment, it is preferable to fixedly spot weld the mount stage 24 to the package 2 at more than one point.

In this case it is made possible to reduce the number of parts of the optical module by a plate or the mount stage 24.

Furthermore, in an embodiment, the lower plate 11 is provided with the upper surface 17 having a maximum height of roughness profile of 1 $\mu$m. However, the lower plate 11 may be provided with the upper surface 17 having a maximum height of roughness profile less than 2 $\mu$m, more preferably less than 1 $\mu$m or less.

Figure 10:
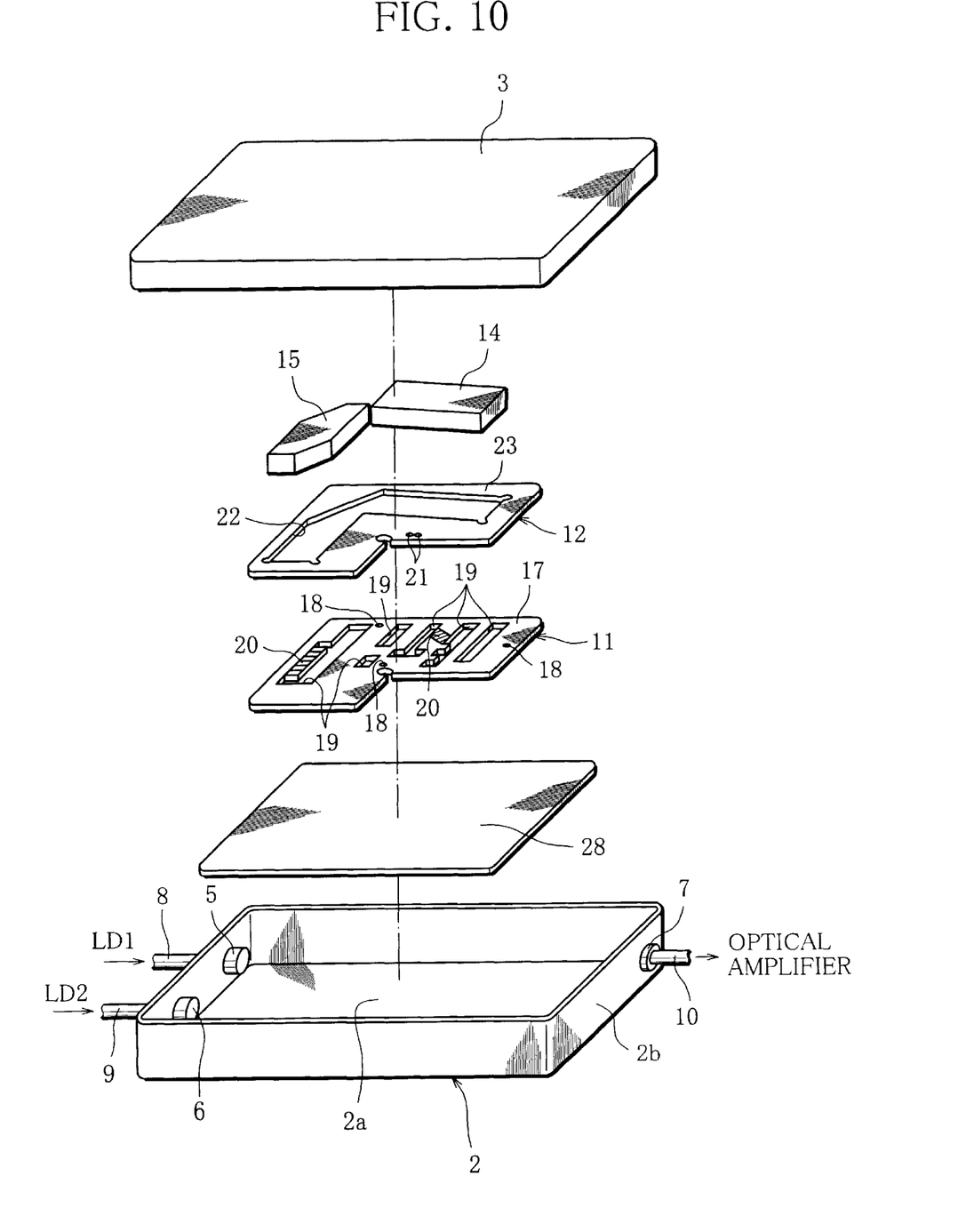
FIG. 10 is an exploded perspective view illustrating an optical module according to a modified embodiment of the present invention.

Furthermore, in an embodiment, the lower plate 11 is directly fixed to the bottom surface 2a of the package 2. However, as shown in FIG. 10, the lower plate 11, the upper plate 12, or the mount stage 24 may be fixed to the bottom surface 2a of the package 2 via a plate 28 or dish like member, etc. In this case, a method other than welding can be employed for fixing these parts by point contact instead of spot welding.

Furthermore, in an embodiment, the lower plate 11 and the upper plate 12 are a plate formed of metal; however, the plates 11 and 12 may be formed of a plate of material other than metal (e.g., a glass plate).

Furthermore, the plates 11 and 12 may also be formed in a block shape other than in a plate shape in accordance with the shape of the optical element to be fixed.

What is claimed is:

1. An optical module comprising
    a package for housing an optical element, said package having a base surface, and
    a member interposed between the optical element and the base surface of said package, said member having a mount surface for mounting the optical element thereto, the mount surface being smoother than the base surface of said package and wherein the mount surface of said member has a maximum height of roughness profile of less than 2 $\mu$m, wherein said member includes positioning means for determining relative position between said member and the optical element on the mount surface, and wherein said positioning means has a recess for allowing the optical element to be at least partially fitted therein.

2. The optical module according to claim 1, wherein said member includes
    a first plate having the mount surface, and
    a second plate disposed on the mount surface of said first plate, said second plate having a through-hole acting as the recess.

3. The optical module according to claim 2, wherein said member is made of metal and formed in one piece.

4. The optical module according to claim 2, wherein the mount surface of said first plate is provided with a region to allow the optical element to be bonded thereto, and at least a part of a contour of said bonding region is bounded by at least one pit.

5. The optical module according to claim 4, wherein said first plate and said second plate are formed of metal.

6. The optical module according to claim 5, wherein each of said first and second plates are cut out by chemical etching from a metal sheet.

7. The optical module according to claim 6, wherein said optical module includes one or more spot welded portions for connecting between said first plate and said second plate and between said first plate and said package, respectively.

8. The optical module according to claim 6, wherein said module further comprises a sheet interposed between said member and said package.

* * * * *